UNITED STATES PATENT OFFICE 2,409,086

REACTION PRODUCTS OF NITRILES AND ALDEHYDES

Joseph Frederic Walker, Lewiston, N. Y., assignor to E. I. du Pont de Nemours & Company, Wilmington, Del., a corporation of Delaware No Drawing. Application May 1, 1943,
Serial No. 485,361

1 Claim. (Cl. 260—464)

This invention relates to reactions between organic carbonyl compounds and ethylenic unsaturated compounds, and to the novel chemical products resulting therefrom. More particularly, it is directed to certain novel reactions between aliphatic aldehydes, including aldehydes containing alkyl, aryl, cycloaliphatic, and aralkyl substituents, and acrylonitrile, and to the new and useful chemical compounds resulting from these reactions.

It is an object of this invention to produce by reaction of acrylonitrile and aldehydes new and valuable chemical compounds containing one or more β-cyanoethyl groups attached to that carbon atom which is positioned adjacent to the aldehyde group in the particular aldehyde reacted with acrylonitrile. It is, moreover, another object of my invention to provide a method for carrying out such reactions in the presence of alkaline condensing agents. Another object of my invention is to provide a method for preparing new chemical compounds, the aldehydonitriles having the generic formula

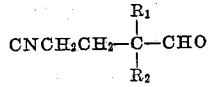

where $R_1$ is hydrogen or methyl and $R_2$ is hydrogen, methyl, or β-cyanoethyl. These and still further objects of my invention will be apparent from the ensuing disclosure of certain preferred embodiments thereof.

The aldehydes which, in accordance with my invention, are reacted with acrylonitrile (vinyl cyanide) are those having at least one active hydrogen atom attached to the carbon atom which is positioned alpha to the aldehyde group. They may be characterized generically as compounds of the chemical constitution:

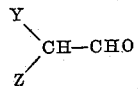

wherein Y and Z represent hydrogen, alkyl, aryl, cycloaliphatic and aralkyl radicals, the radicals Y and Z being the same or different organic groups.

When acrylonitrile is reacted with an aldehyde of the above-identified formula in which Y and Z are both alkyl groups, the resultant product will be a cyano-ethyl di-alkyl aldehyde in which the two alkyl groups are joined to the carbon atom alpha to the aldehyde group.

It is obvious from the foregoing definition that formaldehyde, which does not have a reactive hydrogen atom attached to a carbon atom positioned alpha to the aldehyde group, is not one of the reactants which I employ in the reaction with acrylonitrile, as I have found that formaldehyde gives products different in character from those resulting when higher aldehydes are reacted.

Examples of aldehydes which may be utilized in my process are acetaldehyde, propionaldehyde, butyraldehyde, isobutyraldehyde, valeraldehyde, isovaleraldehyde, heptaldehyde, phenylacetaldehyde, hydrocinnamaldehyde, etc.

In the reaction it is possible to introduce one β-cyanoethyl group in place of a hydrogen atom attached to the carbon atom which is positioned adjacent the aldehyde group or two or three β-cyanoethyl groups may be introduced where this carbon atom contains two or three replaceable hydrogen atoms. Thus, with acetaldehyde, it is possible to produce β-cyanoethyl acetaldehyde CNCH₂CH₂CH₂CHO by introducing one β-cyanoethyl group in place of a reactive hydrogen atom positioned alpha to the aldehyde group. Similarly, it is possible to introduce two β-cyanoethyl groups to form γ-formyl pimelonitrile

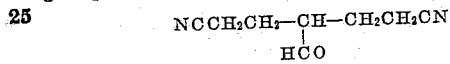

or tri-1,1,1,-(β-cyanoethyl) acetaldehyde by the replacement of three reactive hydrogen atoms by β-cyanoethyl groups. Of course where there are less than three reactive hydrogen atoms on the carbon atom adjacent the aldehyde group, as in propionaldehyde or isobutyraldehyde the number of β-cyanoethyl groups replacing hydrogen on this carbon atom cannot exceed the number of reactive hydrogen atoms attached thereto.

In carrying out the reaction the acrylonitrile and aldehyde are brought together in the presence of a substance which is alkaline in reaction. Any of the usual alkaline condensing agents have been found effective in promoting the reaction. These alkaline condensing agents are generally more alkaline than sodium carbonate, although with less alkaline compounds, such for example as the alkyl amines, the reaction will proceed but generally at a slower rate. Among alkaline condensing agents which I have found particularly useful in the process may be mentioned the alkali metal and alkaline earth metal oxides, hydroxides, carbonates, hydrides, cyanides and alcoholates, as well as the alkali metals themselves, as for example, metallic sodium. The alkali metal hydroxides and cyanides, as sodium hydroxide and sodium cyanide, have been found particularly effective.

Generally the catalyst or condensing agent should be present in amounts sufficient to render the reaction mixture alkaline in reaction. Amounts ranging from 0.5% to 10% by weight, based on the weight of the reaction mixture, are suitable. With relatively stronger alkaline condensing agents, such as metallic sodium and the alkali metal hydroxides and cyanides, amounts not exceeding 3% will ordinarily be found to give satisfactory results.

Since the reaction is exothermic in character, after initially bringing the reaction mixture to the reaction temperature, one within the range 0 to 100° C., further heating is unnecessary and cooling may be necessary to dissipate any excessive amount of heat developed. The reaction may be carried out without employment of diluting agents, but if diluents are added I have found inert liquids such as hexane, benzene, ether, and petroleum ether most satisfactory.

The particular sequence of adding the reagents is unimportant, as all that is necessary in order that the reaction may proceed is to bring the reagents together in intimate admixture in the presence of the alkaline condensing agent. In practice it is generally preferred first to mix the aldehyde and acrylonitrile, and then introduce the alkaline condensing agent, at the same time applying initial heating, if necessary, in order to bring the contents of the reaction vessel to a temperature at which the reaction will proceed rapidly and smoothly.

The products resulting by reaction of acrylonitrile with aldehydes, the new aldehydonitriles, are valuable as intermediates in the preparation of a large number of organic compounds and for other purposes, such as in the manufacture of plastic products.

The following examples illustrate this invention:

Example 1

In a one-liter flask fitted with a stirrer, a reflux condenser, a thermometer and a delivery tube extending to a point adjacent the bottom of the flask, there was placed 212 grams (4 mols) of acrylonitrile. While stirring and heating under reflux were continued, 3 cc. of a 50% solution of sodium hydroxide was added to the acrylonitrile, after which 88 grams (2 mols) of acetaldehyde was vaporized and the vapors passed into the acrylonitrile. The rate of addition of the acetaldehyde was controlled so as to prevent heat surges. The addition required about 2 to 3 hours, after which stirring was continued for an additional period of one hour.

The resulting mixture was cooled, neutralized with dilute hydrochloric acid, and unreacted materials were distilled off. The resulting residue was subjected to vacuum distillation whereby products boiling at 86° C. to 95° C., and 145° C. to 149° C., at a pressure of 3 millimeters of mercury were obtained. The lower boiling material, identified as γ-cyanobutyraldehyde, had a molecular weight and nitrogen content corresponding to those values for that compound. The higher boiling material was identified as γ-formyl-pimelo-nitrile. The combined yield of the two products was about 40 to 50% of theoretical.

Example 2

A mixture of 72 grams (1 mol) of isobutyraldehyde and 159 grams (3 mols) of acrylonitrile was placed in a reaction flask provided with a stirrer, a reflux condenser and a thermometer. Five cubic centimeters of a saturated solution of sodium hydroxide was added as alkaline condensing agent and the reaction mixture was agitated and heated at reflux temperature for two hours. A reddish-orange colored solution resulted, and the reflux temperature rose gradually during the course of the reaction from 65° C. to about 80° C. Precautions were observed during the reaction to maintain the temperature at or below 80° C. The resulting mixture, after cooling and neutralizing with hydrochloric acid, was distilled at a pressure slightly below atmospheric in order to remove unreacted material.

The residue was distilled at a pressure of 3 mm. A product boiling at 125° C. to 135° C. at 3 millimeters of mercury pressure was obtained, along with a fraction boiling at 100° C. to 115° C. at 3 millimeters of mercury pressure. The latter was isobutyraldol. The higher boiling product was identified as α,α-dimethyl-γ-cyanobutyraldehyde. By operation in this manner yields of α,α-dimethyl-γ-cyanobutyraldehyde corresponding to 35 to 40% of theory may be realized.

Example 3

Five cc. of a saturated solution of sodium hydroxide was added cautiously to 212 grams (4 mols) of acrylonitrile heated under reflux. To the resulting mixture there was then added, in small increments, 58 grams (1 mol) of propionaldehyde, after which the mixture was cooled and treated for recovery of product as in Example 1.

Two products were obtained. The first chemical compound boiled at 92° C. to 94° C. at 3 millimeters of mercury pressure, and had molecular weight and nitrogen content corresponding to α-methyl-γ-cyanobutyraldehyde. The second chemical compound boiled at 135.5° C. to 137° C. at 3 millimeters pressure, and was identified as γ-methyl-γ-formyl-pimelonitrile. The yields of the lower-boiling and higher-boiling products were 4.9% and 25.1%, respectively.

Example 4

Acrylonitrile (4 mols) and acetaldehyde (2 mols) were reacted as described in Example 1 utilizing sodium cyanide as alkaline condensing agent in place of sodium hydroxide. The combined yield of γ-cyanobutyraldehyde and γ-formyl-pimelonitrile was 38% of the theoretical based on the amount of acetaldehyde reacted.

The new chemical compounds produced by reacting aldehydes and acrylonitrile, in accordance with the process described, are those characterized generically by the formula:

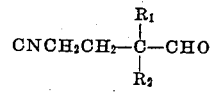

said compounds being aldehydonitriles. In this generic formula $R_1$ represents hydrogen or a methyl group; and $R_2$ represents hydrogen, methyl, or the β-cyanoethyl radical (CNCH$_2$CH$_2$—).

Various changes may be made in the process for reacting acrylonitrile with aldehydes as herein described which would come within the scope of my invention.

I claim:

As a new chemical compound γ-formyl pimelonitrile.

JOSEPH FREDERIC WALKER.